United States Patent
Kollitz et al.

Patent Number: 5,375,968
Date of Patent: Dec. 27, 1994

[54] WIND TURBINE GENERATOR

[76] Inventors: Gerhard Kollitz, 16801 Sendero Del Charro, Riverside, Calif. 92504; Ronald W. Kollitz, 3121 Oak St., SE., Albany, Oreg. 97321

[21] Appl. No.: 74,022
[22] Filed: Jun. 2, 1993
[51] Int. Cl.⁵ .............................. F03D 7/04
[52] U.S. Cl. ........................ 415/2.1; 415/4.2
[58] Field of Search ............ 415/2.1, 4.1, 4.2, 4.4, 415/907

[56] References Cited

U.S. PATENT DOCUMENTS

| | | | |
|---|---|---|---|
| 1,463,928 | 8/1923 | Ozaki | 415/4.4 |
| 1,974,008 | 9/1934 | Biehn | 415/4.4 |
| 3,986,785 | 10/1976 | Ferencz | |
| 4,318,019 | 3/1982 | Teasley et al. | 415/907 |
| 4,486,143 | 12/1984 | McVey | |
| 4,494,007 | 1/1985 | Gaston | |
| 4,496,848 | 1/1985 | Binder | |
| 4,498,017 | 2/1985 | Parkins | |
| 4,508,972 | 4/1985 | Willmouth | |
| 4,511,807 | 4/1985 | Somerville | |
| 4,545,729 | 10/1985 | Storm | |
| 4,551,631 | 11/1985 | Trigilio | |

FOREIGN PATENT DOCUMENTS

| | | | |
|---|---|---|---|
| 2288878 | 5/1976 | France | 415/2.1 |
| 2043047 | 4/1977 | Japan | 415/4.2 |
| 0001251 | 7/1977 | Japan | 415/2.1 |
| 0985402 | 12/1982 | Russian Federation | 415/2.1 |

Primary Examiner—Edward K. Look
Assistant Examiner—Mark Sgantzos
Attorney, Agent, or Firm—Price, Gess & Ubell

[57] ABSTRACT

An improved wind turbine is provided with a rotor assembly provided with a plurality of wind-drivable blades and surrounded by a rotatable wind deflector assembly. The deflector assembly is provided with a plurality of deflector vanes and two semicylindrical deflector panels of unequal length.

14 Claims, 4 Drawing Sheets

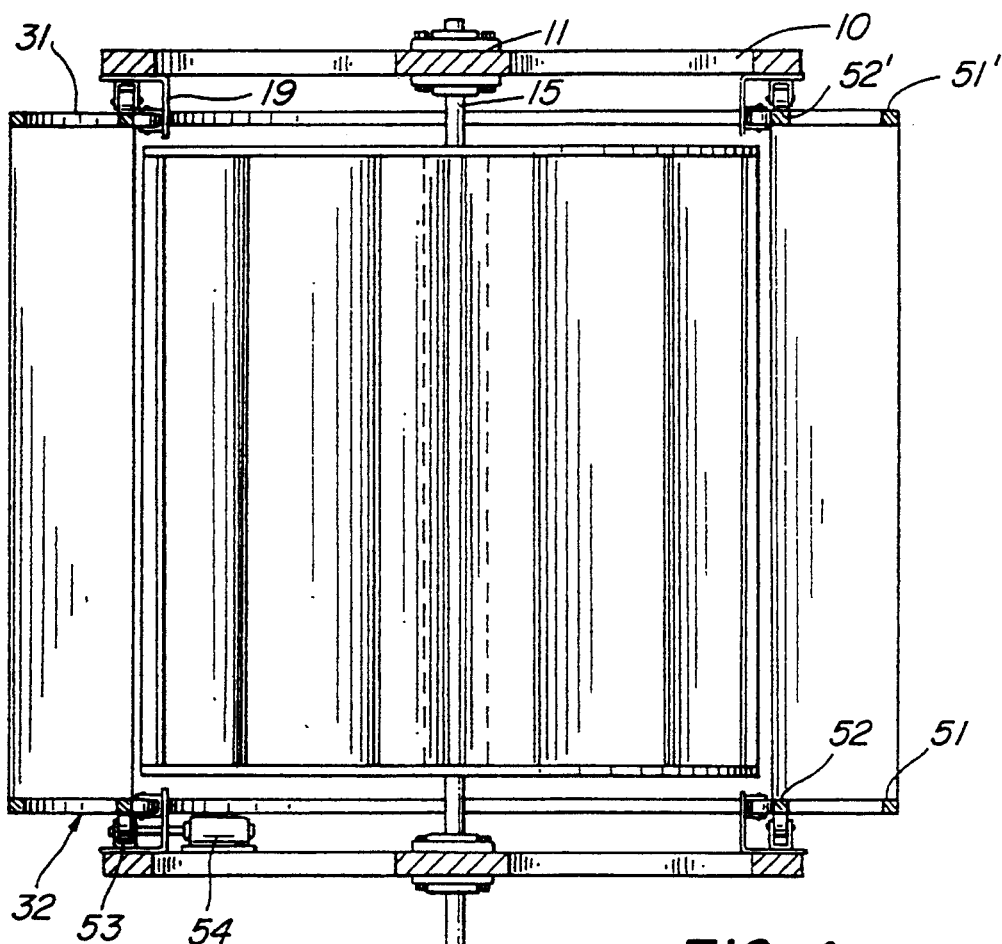
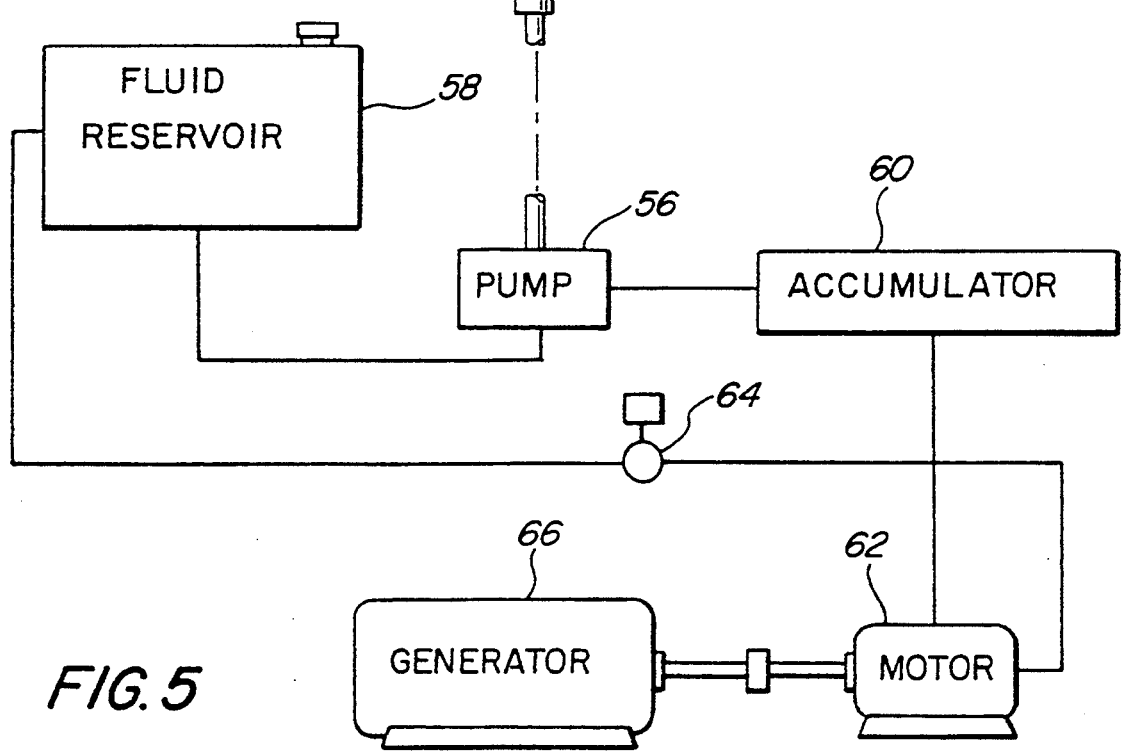
FIG. 4
FIG. 5

WIND TURBINE GENERATOR

BACKGROUND OF THE INVENTION

1. Field of the Invention

The present invention relates generally to wind energy collectors and, specifically, to an improved wind turbine generator.

2. Description of Related Art

With the concern to conserve energy and to produce energy in the most efficient manner from existing energy sources, there have been numerous designs in the past to provide wind energy collection apparatus. Older designs tended to favor the vertically-disposed, airplane propeller type. More recently, artisans have tended to use a horizontally disposed, turbine type design. An advantage of the horizontal design is the use of an efficient turbine that has a large surface area to interact with and absorb energy from the wind. However, the basic turbine is substantially cylindrical in shape and does not have a preferred operational orientation like the substantially disc-shaped propeller design. That is to say, a propeller interacts maximally when its axis of rotation is directly parallel to the direction of the wind. This orientation is maintained by mounting the axis of rotation horizontally with means to rotate that axis to be parallel to the prevailing wind. On the other hand, a turbine operates maximally when its axis of rotation is perpendicular to the prevailing wind. However, maximal efficiency is attained only when means are provided to direct the prevailing wind to one quadrant of the turbine and shield the other parts of the turbine from the wind. Thus, the turbine is not inherently directional, and the required responsiveness to wind direction is provided not by reorienting the turbine about its vertical axis of rotation, but by redirecting the wind.

For example, Trigilio, U.S. Pat. No. 4,551,631, for "Wind and Solar Electric Generating Plant," provides a plurality of shutter assemblies disposed in a circular relationship around a turbine assembly. Five wall assemblies extend tangentially from the circular periphery defined by the shutter assemblies. Opening and closing appropriate shutters directs the wind to the appropriate parts of the turbine and allows a response to changes in wind direction. Ferencz, U.S. Pat. No. 3,986,785, for "Vertical Axis Wind Motor," uses a plurality of reorientatable deflectors situated annularly around the turbine to direct the wind. Storm, U.S. Pat. No. 4,545,729, for "Wind Turbine Apparatus," provides a plurality of sail elements and a system of weights and cables that change the sail elements in response to changes in the wind. In Storm the directionality is provided by modifying the turbine itself. These inventions permit considerable deflection of the wind and control over changes in the prevailing wind direction, but at considerable expense and mechanical complexity. Binder, U.S. Pat. No. 4,496,848, for "Device for Harnessing Wind Energy Including Shock Absorber," provides a single semicylindrical shield that is rotatable about the turbine. This provides relatively simple control over changes in wind direction, but does nothing to redirect the wind to maximize turbine energy conversion.

OBJECTS AND SUMMARY OF THE INVENTION

One object of the present invention is to provide an improved wind energy collection apparatus.

Another object of the present invention is to provide an improved wind turbine generator that is low in manufacturing cost and is simple in design.

A further object of the present invention is to provide a wind turbine generator that can operate efficiently over a wide range of wind strengths: both light winds and extremely strong winds.

A further object of the present invention is to provide a wind turbine that can not only operate under a variety of wind strengths and respond to changes in wind direction, but also includes a method for stopping the turbine rotation without the need for a mechanical brake.

These and other objects of the present invention are particularly accomplished by a turbine assembly comprising a plurality of blades to capture wind energy. The turbine assembly is mounted in a supporting frame with a vertical axis of rotation. The turbine assemblies may be stacked vertically. Mounted rotatably about each turbine assembly and supported by the same supporting frame is an annular wind deflector assembly. On one side this assembly contains a plurality of curved wind deflector vanes and a single straight deflector vane. On the opposite side of the deflector assembly from the vanes are two semicylindrical panels of unequal length with a space between them. The longer of the panels forms the outer wall of an elongated hollow member that is substantially trapezoidal in cross-section. The second panel has curved vanes attached to its vertical edges. If the wind strength causes the turbine to rotate too fast, the turbine speed is controlled by rotating the deflector assembly away from its optimal position.

If the turbine is to be brought to a complete halt, the wind deflector can be rotated so that the prevailing wind strikes the turbine blades from the wrong side, causing a braking effect.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein:

FIG. 4 is a cross-sectional view through the present invention;

FIG. 5 is a diagram of that portion of the present invention which converts the rotational movement of the vertical shaft to electrical energy;

DETAILED DESCRIPTION OF THE PREFERRED EMBODIMENTS

The following description is provided to enable any person skilled in the wind energy field to make and use the present invention, and sets forth the best mode contemplated by the inventors for carrying out their invention. Various modifications, however, will remain readily apparent to those skilled in the art, since the generic principles of the present invention have been defined herein specifically to provide an improved wind turbine generator.

Figure 1:
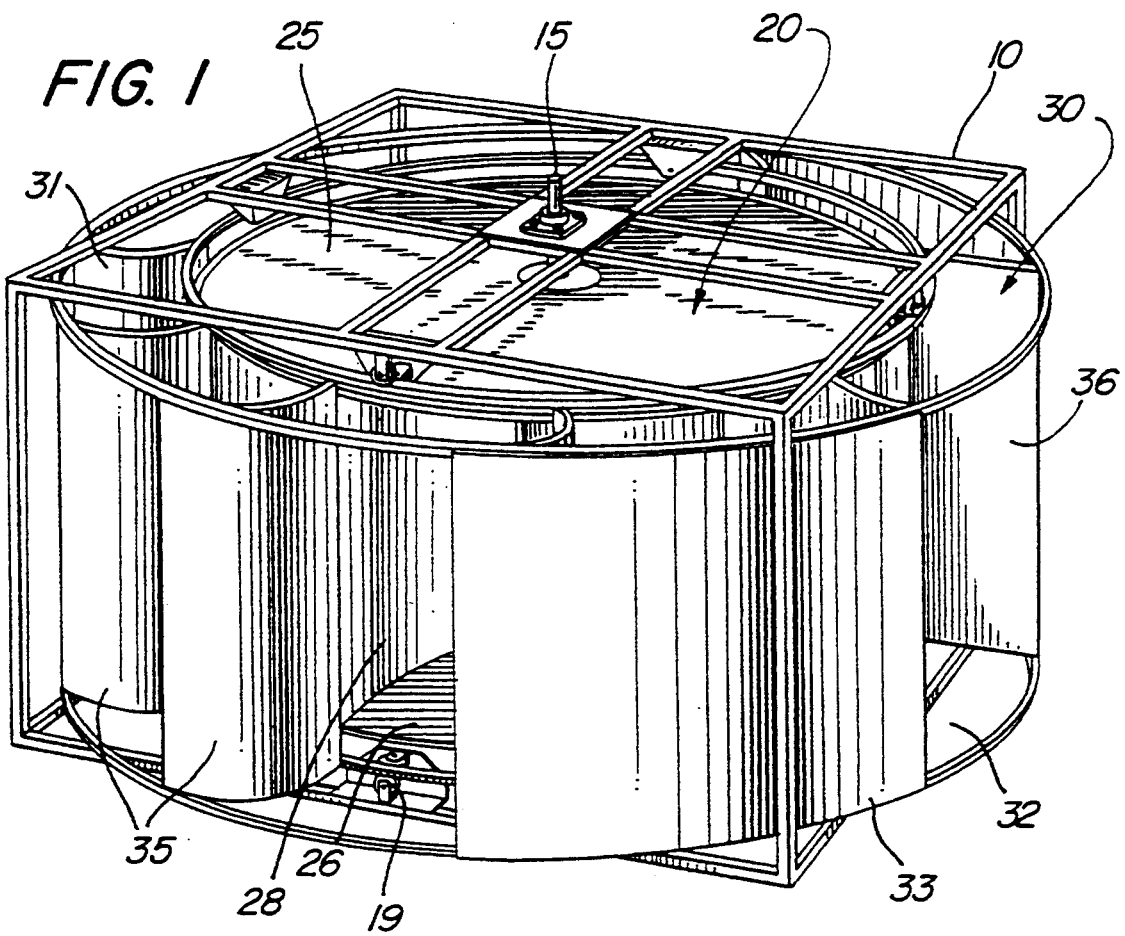
FIG. 1 is a perspective view of the present invention.
Figure 2:
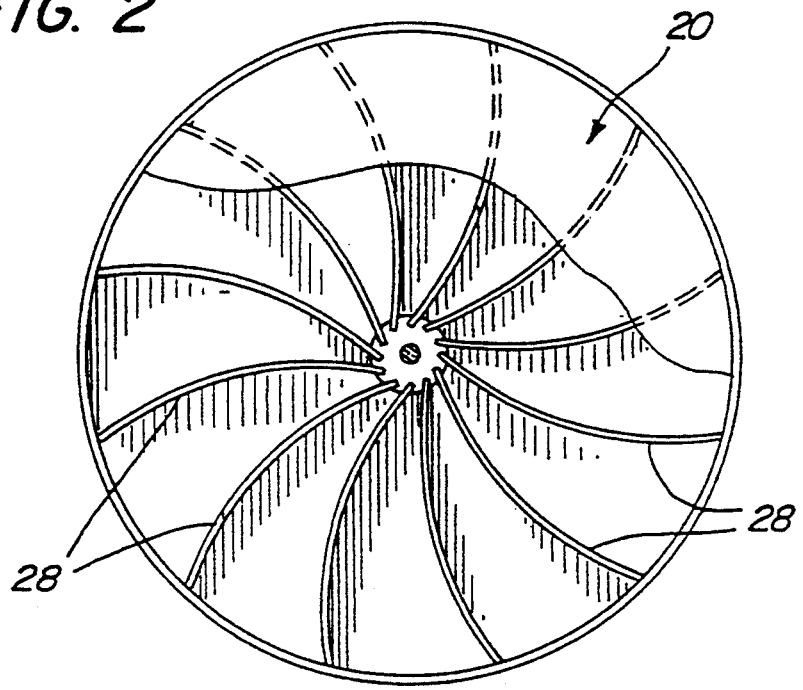
FIG. 2 is a top view of the rotor assembly.

FIG. 1 shows the invention in a perspective view. The supporting structure 10 is open to allow wind to pass through unimpeded. A vertical shaft 15 is supported by the structure, and attached to the vertical shaft is the rotor assembly 20. The assembly comprises an upper circular plate 25 and a lower circular plate 26 between which are fixed the curved blades 28 which interact with the wind. Surrounding the rotor assembly 20 is an annular wind deflector assembly 30 which is comprised of an upper annular ring 31 and a lower annular ring 32. The rings are rotatably mounted to the supporting structure by bearing means 19. Fixed between the annular rings are a plurality of deflector members including curved vanes 35 and semicylindrical deflector modules 33 and 36. FIG. 2 shows a top view of the rotor assembly so that the organization of the curved blades 28 is more readily apparent.

Figure 3:
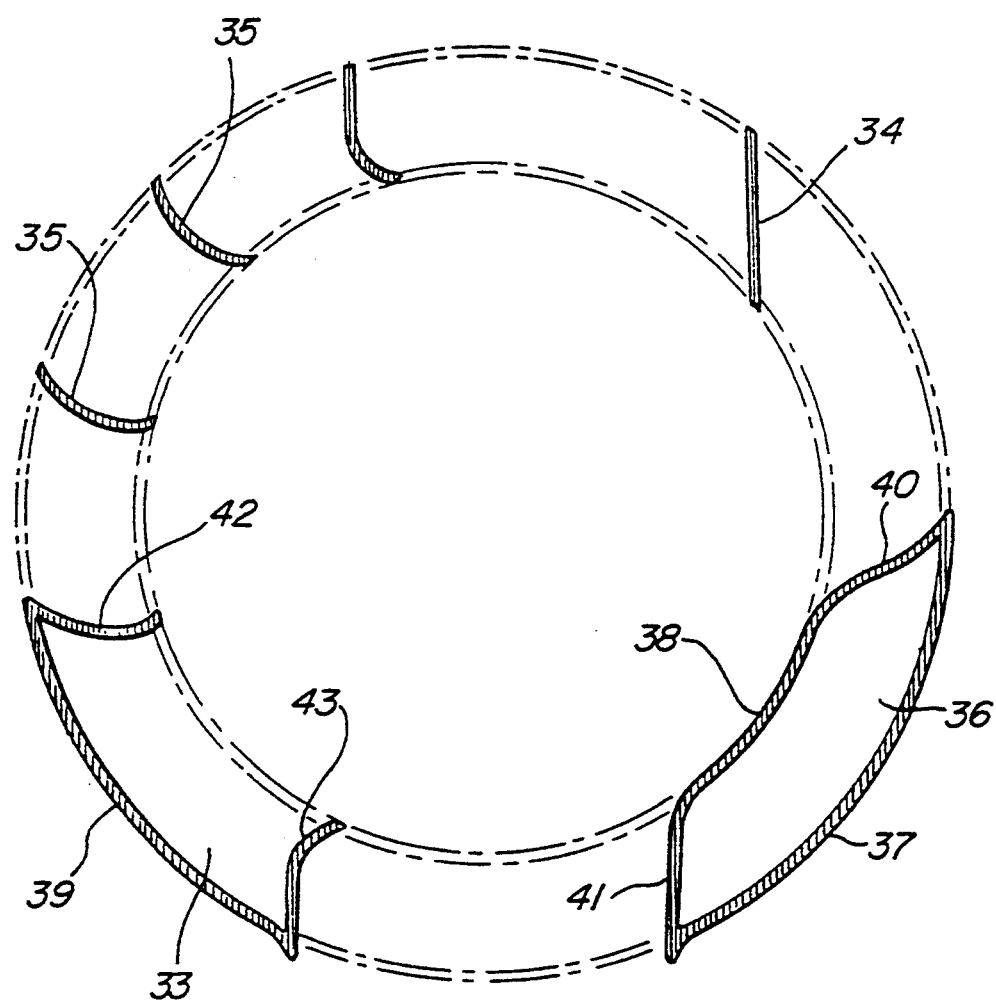
FIG. 3 is a top view of the deflector assembly.

FIG. 3 show a top view of the deflector assembly so that arrangement of the deflector members can be seen. There is a single straight deflector vane 34. The straight vane 34 is oriented so that it forms an obtuse angle of about 130 degree with a line drawn from a center of the deflector assembly 30 and an end of the straight vane 34 nearest to the deflector assembly 30. Clockwise from the straight deflector vane are the two, unequal in length, deflector modules. The first deflector module 36 is longer. In three dimensions this module forms an elongated member that is substantially trapezoidal in cross-section. The trapezoidal cross-section is created by an outer semicylindrical wall segment 37 and a inner semicylindrical wall segment 38 that is shorter than the outer segment and substantially parallel to it. The inner and outer segments are connected to each other by the wall segments 40 and 41. The second deflector module 33 is comprised by a semicylindrical wall segment 39 to which is attached two concave-faced vanes 42 and 43. The two deflector modules 33, 36 are disposed to occupy about one half of the annular rings with a space 84 (see FIG. 6) between them. Between the second deflector module and the single straight deflector vane are spaced at least three concave-faced deflector vanes 35. These vanes are oriented with their concave surfaces facing the straight vane so that the prevailing wind is deflected onto the curved blades, causing the rotor assembly to turn clockwise.

Referring to FIG. 4, a cross-section of the device, vertical shaft 15 is rotatably supported by bearings 11 on support structure 10. The annular rings 31 and 32 of the wind deflector assembly are equipped with support rails 51, 51', 52, and 52'. The deflector members are supported by the rails, and rail 52 moves through rolling bearings 19, which are attached to support structure 10. Drive means 53 engages rail 52 so that actuator means 54 can rotate the wind deflector assembly in response to the direction of the prevailing wind as sensed by a wind detector (not shown).

Figure 6:
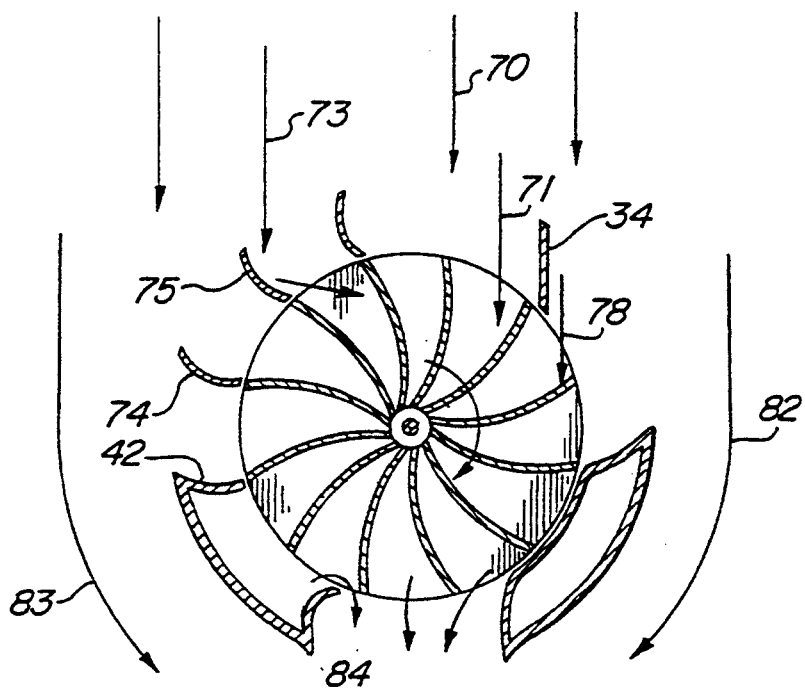
FIG. 6 is a diagram of the rotor assembly and the wind deflector oriented to achieve maximal wind energy conversion.

The present invention operates in the following manner. FIG. 6 shows a top view of the rotor assembly with the wind deflector assembly oriented for maximum energy collection. The straight vane 34 is oriented essentially parallel to the prevailing wind 70. Wind 71 entering the top center of the device strikes the concave face of a blade, propelling the rotor assembly in a clockwise direction. Similarly, wind 78 entering to the right of top center strikes the concave face of a blade, also propelling the rotor assembly in a clockwise direction. Straight vane 34 ensures that wind entering at a slight angle will not oppose the clockwise movement of the rotor assembly: wind coming from the right is prevented from striking the convex surface of a blade; wind coming from the left is deflected onto the concave surface of the adjacent blade. Wind 73 entering to the left of the top center strikes vane 35 is deflected to strike the concave faces of the adjacent blades, propelling the rotor assembly in a clockwise direction. Vanes 35' and 42 deflect wind in a similar manner. Wall segment 40 (see FIG. 3) deflects air into the blades while wall segment 38 (see FIG. 3) traps the air as the blades rotate past. Because deflector module 36 is longer than deflector module 33, wind 82 traveling down the right side of the invention must move faster than wind 83 traveling down the left side. This results in a low pressure area in the region of the space 84 which pulls air off the convex surface of the blades, further propelling the rotor assembly in a clockwise direction. The compression of the air facilitated by wall segment 38 enhances this effect. Deflector module 33 is open on its inside, facilitating unloading of air from the blades.

Figures 7, 8:
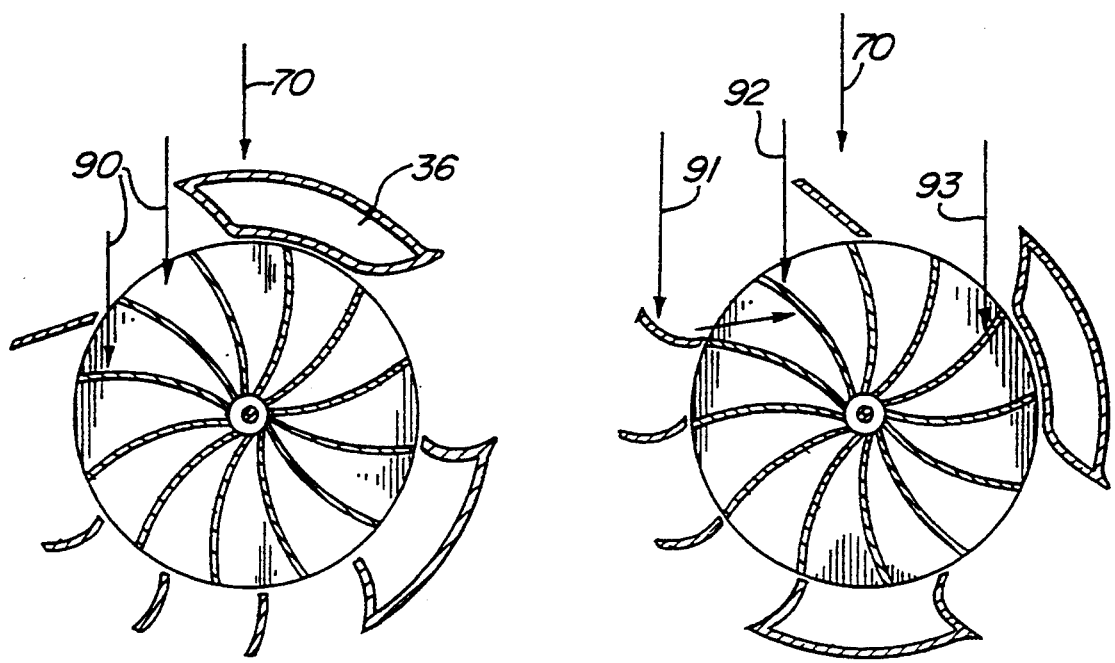
FIG. 7 is a diagram of the rotor assembly and the wind deflector oriented to achieve braking of the rotor assembly.
FIG. 8 is a diagram of the rotor assembly and the wind deflector oriented to control the speed of the rotor assembly.

If it is necessary to stop the rotation of the rotor assembly, the deflector assembly is rotated into the position shown in FIG. 7. In this position the first deflector module 36 blocks the prevailing wind 70 that would directly impinge on the concave faces of the rotor blades from the top. The second deflector module 33 further blocks wind that would strike the concave sides of the vanes on the right side of the rotor assembly. With this orientation, no low-pressure zone is produced between the two modules. Because the deflector vanes are now out of the prevailing wind, that wind 90 that strikes the rotor assembly to the left of top center hits the convex surface of the blades, causing a braking action. To modulate the rotor assembly speed under high wind conditions, the deflector assembly can be rotated into an intermediate position as shown in FIG. 8. Wind 93 strikes the concave blade surface, while wind 92 strikes the convex surface. Wind 91 is deflected to strike the concave surface. The deflector vanes are struck from both sides and the deflector module-low pressure unloading is decreased or absent, thus slowing the rotational rate. It would be apparent to one skilled in the art that by adjusting the control system so that the wind deflector is moved to various positions between FIG. 6 and FIG. 7, any desired speed of rotation can be maintained over a wide range of wind speeds and wind directions.

Vertical shaft 15 transmits rotational energy which the wind energy collector has extracted from the wind. This rotational energy can be used in a number of manners. FIG. 5 shows a preferred arrangement. The rotational movement of the vertical shaft 15 is used to drive a pump 56. The pump 56 uses the fluid from a fluid reservoir 58 to create pressure within an accumulator 60. The accumulator 60 is so designed to accumulate pressure until a desired level is reached. At that desired level, the accumulator 60 provides an output pressure to a fluidic motor 62, which can then drive a generator 66. The output fluid pressure from the fluidic motor 62 is regulated by a governor 64 and allows the fluid to return to the fluid reservoir 58. This system allows a steady generation of electricity in spite of intermittent gusts of wind because energy is stored in the accumulator.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved wind energy collection device, comprising:

a rotor assembly including a plurality of wind-drivable blades rotatable on a vertical axis;

an annular wind deflector assembly, rotatably mounted, surrounding the rotor assembly, comprising a plurality of deflector members, the deflector assembly including:

two semicylindrical deflector panels of unequal lengths disposed on one side of the annular deflector assembly with a Space between them so that a region of low air pressure will form near the space when the deflector assembly is oriented about 180 degrees from prevailing wind; and a plurality of concave-faced deflector vanes situated along the deflector assembly on an opposite side from the semicircular deflector panels, the concave faces of the vanes facing so that wind is deflected into the blades of the rotor assembly to cause rotation of the rotor assembly; and means to rotate the deflector assembly about the rotor assembly independent of wind direction.

2. The device of claim 1 wherein the longer of the two semicylindrical deflector panels forms a longer parallel wall segment of a vertically-elongated hollow member that is substantially trapezoidal in cross-section.

3. The device of claim 1 wherein the shorter of the two semicylindrical deflector panels bears two concave-faced vanes, each attached along one vertical edge of the deflector panel.

4. The device of claim 1 wherein the wind-drivable blades of the rotor assembly are concave-faced.

5. The device of claim 1 wherein the wind-drivable blades of the rotor assembly are angled with respect to a radius of the rotor assembly.

6. The device of claim 1, wherein the deflector vanes are disposed so that the deflector assembly can be positioned to reverse rotation of the rotor assembly.

7. An improved wind energy collection device, comprising:

a rotor assembly including a plurality of wind-drivable blades rotatable on a vertical axis;

an annular wind deflector assembly rotatably mounted surrounding the rotor assembly comprising a plurality of deflector members, the deflector members including:

one substantially straight deflector vane;

two semicylindrical deflector panels of unequal lengths disposed on one side of the deflector assembly with a space between them so that a region of low air pressure forms near the space when prevailing wind comes from the side of the deflector assembly opposite the space, a first, longer deflector panel being closer to the straight deflector vane along the circumference of the deflector assembly than is a second deflector panel; and a plurality of concave-faced deflector vanes situated along the deflector assembly on an opposite side from the deflector panels, the concave faces of the vanes facing the straight deflector vane so that wind is deflected onto the blades of the rotor assembly to cause rotation of the rotor assembly; and means to rotate the annular wind deflector assembly around the circumference of the rotor assembly in response to the direction of wind impinging on the wind energy collection device so that rotation of the rotor is maximized or prevented.

8. The device of claim 7 wherein the first semicylindrical deflector panel forms a longer wall segment of a vertically-elongated hollow member that is substantially trapezoidal in cross-section.

9. The device of claim 7 wherein the second semicylindrical deflector panel bears two concave-faced vanes, each attached along one vertical edge of the deflector panel, the vane on an edge closest to the concave-faced deflector vanes having its concave surface facing the deflector vanes, and the vane on the edge closest to the first semicylindrical panel having its concave surface facing the first deflector panel.

10. The device of claim 7 wherein the wind-drivable blades of the rotor assembly are concave-faced.

11. The device of claim 7 wherein the wind-drivable blades of the rotor assembly are angled with respect to a radius of the rotor assembly.

12. An improved wind energy collection device, comprising:

a vertically-extending support structure formed of an open framework through which wind can freely pass;

a vertical shaft disposed centrally on the support structure;

bearing means so that the vertical shaft is free to rotate;

a rotor assembly including a plurality of wind-drivable concave-faced blades rotatable on a vertical axis, the assembly including an upper circular plate attached to the vertical shaft and a lower circular plate attached to the vertical shaft, the blades being fixed between the two circular plates;

an annular wind deflector assembly surrounding the rotor assembly and rotatably mounted to the support structure, the deflector assembly including:

an upper annular ring and a lower annular ring, each ring having an inner edge closer to the rotor assembly and an outer edge, and deflector members fixed between the upper and the lower rings, the deflector members including:

one substantially straight deflector vane which extends from a first edge of the annular ring to a second edge of the ring and which is oriented so that a vertical edge of the vane that contacts the inner edge of the annular ring forms an angle of about 130 degrees with a line drawn from that edge to the vertical shaft;

two deflector modules whose surfaces run along the outer edges of the rings and form semicylindrical panels of unequal lengths, a first, longer deflector module being closer to the straight deflector vane along the circumference of the deflector assembly than is a second deflector module; and the first deflector module forming a hollow, vertically-elongated member that is substantially trapezoidal in cross-section with a semicylindrical wall segment along the outer edges of the annular rings, an inner, and substantially shorter, semicylindrical wall segment along the inner edges of the annular rings, and two wall segments connecting the semicylindrical wall segments, and the second deflector module comprising a semicylindrical panel along the outer edges of the annular rings, the panel bearing two concave-faced vanes, each attached along an entire vertical edge of the panel and extending to the inner edges of the annular rings, the vane attached to the edge of the panel closest to the straight deflector vane having its concave surface facing the straight vane, and the vane attached to the edge closest to the first deflector module having its concave surface facing the first deflector module;

at least three concave-faced deflector vanes situated along the deflector assembly between the second deflector module and the straight deflector vane, the vanes extending from the inner edges to the outer edges of the annular rings and the concave faces of the curved vanes facing the straight deflector vane so that wind is deflected onto the blades of the rotor assembly to cause rotation of the rotor assembly;

means to rotate the annular wind deflector assembly around the circumference of the rotor assembly in response to the direction of wind impinging on the wind energy collection device; and apparatus located at the lower end of the support structure and having connection with the vertical shaft, whereby the apparatus is driven by the shaft which is rotated by the rotor assembly.

13. The device of claim 12, wherein the deflector vanes are disposed so that the deflector assembly can be positioned to reverse rotation of the rotor assembly.

14. An improved wind energy collection device, comprising:

a rotor assembly including a plurality of blades, said assembly rotatably mounted on a vertical axis and rotating upon wind passing through said blades; and a wind deflector assembly including two semicylindrical panels of unequal lengths occupying a first side of said deflector assembly with a space between, and a plurality of concave-faced vanes, occupying a second side of said deflector assembly, oriented so that wind passing by said vanes is deflected into the blades of said rotor assembly, said deflector mounted for rotation around said rotor assembly so that rotation of the rotor assembly is promoted or inhibited.

* * * * *